United States Patent [19]
Lee et al.

[11] Patent Number: 5,721,474
[45] Date of Patent: Feb. 24, 1998

[54] METHOD AND APPARATUS FOR PREVENTING EXCESSIVE CURRENT FLOW IN A MOTOR

[75] Inventors: Young-Sik Lee, Kyungki-do; Byoung-Own Min, Incheon; Young-Ho Kim, Seoul, all of Rep. of Korea

[73] Assignee: Samsung Electronics Co., Ltd., Suwon, Rep. of Korea

[21] Appl. No.: 700,568

[22] Filed: Aug. 7, 1996

[30] Foreign Application Priority Data

Aug. 11, 1995 [KR] Rep. of Korea ......... 95-24825
Aug. 11, 1995 [KR] Rep. of Korea ......... 95-24826

[51] Int. Cl.$^6$ ................................................ H02P 7/29
[52] U.S. Cl. .................. 318/434; 318/432; 388/819; 388/903
[58] Field of Search .................. 318/268, 432, 318/433, 434, 599; 388/804, 806, 811, 815, 819, 821, 822, 823, 903

[56] References Cited

U.S. PATENT DOCUMENTS

| | | | |
|---|---|---|---|
| 3,989,992 | 11/1976 | Schmidt | 318/257 |
| 4,199,711 | 4/1980 | Horiuchi et al. | 318/139 |
| 4,494,051 | 1/1985 | Bailey | 318/254 |
| 4,562,387 | 12/1985 | Lehnhoff | 318/285 |
| 4,617,507 | 10/1986 | Eisenhaure et al. | |
| 4,680,695 | 7/1987 | Kerkman et al. | |
| 5,140,248 | 8/1992 | Rowan et al. | 318/811 |
| 5,343,382 | 8/1994 | Hale et al. | 318/599 X |

*Primary Examiner*—Bentsu Ro
*Attorney, Agent, or Firm*—Marger, Johnson, McCollom & Stolowitz, PC

[57] ABSTRACT

A motor control circuit comprises a current command circuit generates a current command signal proportional to a selected motor speed. A comparator generates a comparator output signal proportional to the difference between the current command signal and a signal proportional to current flow in the motor. An output terminal of the comparator is operatively connected to a logic circuit which generates a control signal having a duty cycle that varies proportional to the comparator output signal. A drive circuit has an input terminal to which the control signal is applied and an output terminal connected to the motor. The drive circuit generates a motor drive signal proportional to the control signal for driving said motor. A current command control circuit has an input terminal to which the current control signal is applied and an output terminal to which the current command signal is applied. The current command control circuit generates a signal proportional to the control signal and reduces the current command signal when the proportional signal is less than the current command signal.

10 Claims, 5 Drawing Sheets

A clock signal for output logic circuit means

Output signal of pulse width comparison means

Output signal of NAND83

Output signal of current detecting means command Controlled current $E_b = K \cdot \omega$ A clock signal for output logic circuit means Output signal of pulse width comparison means Output signal of NAND83

Output signal of current detecting means

METHOD AND APPARATUS FOR PREVENTING EXCESSIVE CURRENT FLOW IN A MOTOR

BACKGROUND OF THE INVENTION

1. Field of the Invention

The present invention relates to a circuit for preventing a motor from burning out when the motor is constrained and more particularly to a circuit which automatically reduces current flow to a motor responsive to excessive current flow in the motor.

This application corresponds to Korean Patent Applications No. 95-24825 and No. 95-24826, filed Aug. 11, 1995 which are incorporated herein by reference.

2. Description of the Prior Art

A theoretical explanation regarding current flowing when the rotor of a motor is constrained will be described with reference to the related figures. FIG. 5 shows a circuit diagram of a direct current motor.

Referring to FIG. 5, reference V is a voltage for driving the motor, Ra is the resistance of the armature winding of the motor, Ia is the armature current, La is the inductance of the armature winding, and Eb is the counter-electromotive force of the armature. The relation of these variables can be represented by following equations:

$$V = (Ra \times Ia) + La \times (dIa/dt) + Eb$$

$$Eb = K \times W$$

(where K is a constant value and W is the angular velocity of the rotor)

When a motor is constrained due to being overloaded, W=0. Therefore, Eb=0 thus generating motor current high enough to damage a winding of the motor. To protect the motor from such damage, a circuit for limiting current flowing to the coil of motors was provided. With reference to the attached drawings, a conventional current control circuit will be described.

FIG. 1 is a circuit diagram of a conventional motor control circuit. FIG. 2 shows waveform diagrams from selected points of the circuit of FIG. 1.

As shown in FIG. 1, a conventional circuit for preventing motor burn out when a motor is constrained includes current command means 10 for receiving voltages of 0 V to 5 V in an operational amplifier OP11 and outputting a voltage which is used as a reference in controlling the current flowing to the motor. Pulse width comparison means 20 receives and compares the outputs from the current command means 10 and a current detecting means 50.

Output logic circuit means 30 receives and compares the outputs from the pulse width comparison means 20 and a clock pulse, and outputs a control signal. Output driving means 40 receives the control signal from the output logic circuit means 30 and outputs a current signal for driving the motor. Current detecting means 50 receives the current signal from the output driving means 40, generates a waveform proportional to the current signal and supplies it to the pulse width comparison means 20.

In operation, when a current command signal (COM) is applied to an input terminal of the OP Amp OP11 (which works as a buffer and is therefore referred to as 'buffer' below), the current command signal is stabilized by buffer OP11. Then, the signal from OP Amp OP11 is divided by resistors R21 and R22 of the pulse width comparison means 20 and the divided signal is supplied to an input terminal (+) of the comparator CP23. A current detecting signal, which is described below, is applied to an input terminal (−) of the comparator CF23.

When power Vcc is supplied to the motor, the voltage of the motor increases with a fixed slope due to the inductive reactance of the motor. The voltage of the motor therefore changes with respect to time. The motor voltage is detected by a resistor R55 and is applied to a non-inverting terminal of a non-inverting amplifier OP52 through a resistor R54. The voltage across resistor R55 is thereby amplified to a suitable voltage to produce a current detecting signal on the output terminal of comparator amplifier OP52, which is compared with voltage of the current command signal by comparator CP23. The comparator CF23 that receives the two signals generates a high logic level output voltage if the current command is higher than the current detecting signal, and generates a low logic level voltage if the current command is lower than the current detecting signal. However, the current command is a direct current voltage, and the current detecting signal is a voltage that gradually increases to a fixed level each time the motor is pulsed. Thus, at the start of each pulse, the current command is higher than the current detecting signal and the comparator CP23 generates a high logic level voltage.

The current detecting signal has a low leading edge and a higher trailing edge. The current detecting signal therefore equals the current command signal (COM) closer to the trailing edge. The point where the two voltages are equal is called a comparison point, and at the comparison point, the output of the comparator CP23 changes to a low logic level. FIG. 2 illustrates this situation.

The output signal of the pulse width comparison means 20 is applied to an input terminal 1 of a nand gate NAND31 of output logic means 30 and a clock signal having a large duty cycle is inputted into an input terminal 2 of a nand gate NAND32.

The gates NAND31, NAND32 make up a logic circuit having the same function as a conventional RS flip-flop circuit. If a high logic level is applied to input terminal 1 of the nand gate NAND31 and a low logic level is applied to input terminal 2 of nand gate NAND32, a low logic level is generated on output terminal 3 of the nand gate 31, If a low logic level is applied to input terminal 1 of nand gate NAND31 and a high logic level is applied to input terminal 2 of the nand gate NAND32, a high level is generated on output terminal 3 of the nand gate 31. The control signal of the output terminal 3 of the nand gate NAND31 is Shown in FIG. 2C. The control signal is applied to input terminal 2 of the nand gate NAND33, and the output signal from the comparator CP17 is applied to the input terminal 1 of the nand gate NAND33.

A reference voltage Vref is applied to the serially connected resistors R14, R15, R16. The voltage between the resistors R15, R16 is applied to the input terminal (+) of the comparator CP17 and the voltage of the current command signal is applied to the input terminal (−) of the comparator CP17. When the current command signal is higher than the voltage between the resistors R14, R15, the comparator CP17 generates a low logic output signal. The output of the comparator CP18 is applied to the input terminal 2 of the nand gate NAND34. The voltage of the current command signal is applied to the input terminal (+) of the comparator CP18 and the voltage on the resistor R16 is applied to the input terminal (−) of the comparator CP18. When the current command signal is higher than the voltage on resistor R16, the comparator CP18 generates a high logic level output signal.

The nand gates generate low logic level output voltages when both the first and the second input terminals thereof receive a high logic level and generate high logic level output voltages responsive to any other combination of logic levels on the input terminals.

When the current command signal is higher than the voltage on R16, comparator CP18 generates a high logic level output signal. When the current command signal is higher than the voltage between R14, R15, comparator CP17 generates a low logic level signal. Therefore, the nand gate NAND33 generates a waveform inverted from the waveform of the nand gate NAND31 and the nand gate NAND34 generates a high logic level signal. Therefore when the current command signal is higher than a predetermined value, the comparator CP17 generates a signal to rotate the motor with full speed. When the current command is lower than a predetermined value, the comparator CP18 generates a signal to stop the motor.

The control signal from the output logic circuit means 30 is applied to the base of a transistor Q43 of the output driving means 40 through a resistor R41. When the control signal is at a high logic level, the transistor Q43 is turned on and the voltage from the power source Vcc flows into the Found through the resistor R42 and the transistor Q43. In this condition, the transistor Q44 is turned off. The voltage of the resistor R42 is supplied as a bias voltage between the emitter and the base of the transistor Q45. The voltage of the resistor R46 and gate of the transistor Q48 is low thereby preventing current flow in the motor.

When the control signal is a low logic level, the transistor Q43 is turned off, and the voltage between collector and emitter of the transistor Q43 is supplied as a bias voltage between base and emitter of the transistor Q44 to turn on the transistor Q44 and turn off the transistor Q45. The voltage from the power source is applied to a gate of the transistor Q48 through the transistor Q44 and the resistor R46 to turn on the transistor Q48, which supplies current to the motor.

However, because a conventional motor control circuit controls the motor speed by a constant current command supplied by a user, excessive current resulting from overloading the motor was not controlled.

SUMMARY OF THE INVENTION

The object of the present invention is to provide a circuit for preventing motor burn out when a motor is constrained. In one aspect the present invention comprises a method for preventing excessive current flow in a d.c. motor in which a current command signal and a motor-current signal proportional to current flowing in the motor are generated. A current control signal dependent upon the relative magnitudes of the current command signal and the motor-control signal is also generated. The magnitude of the current command signal is adjusted proportional to the current control signal when the current control signal is below a preselected value. A circuit for implementing the method of the invention is also provided.

DETAILED DESCRIPTION OF THE PREFERRED EMBODIMENTS

Figure 1:
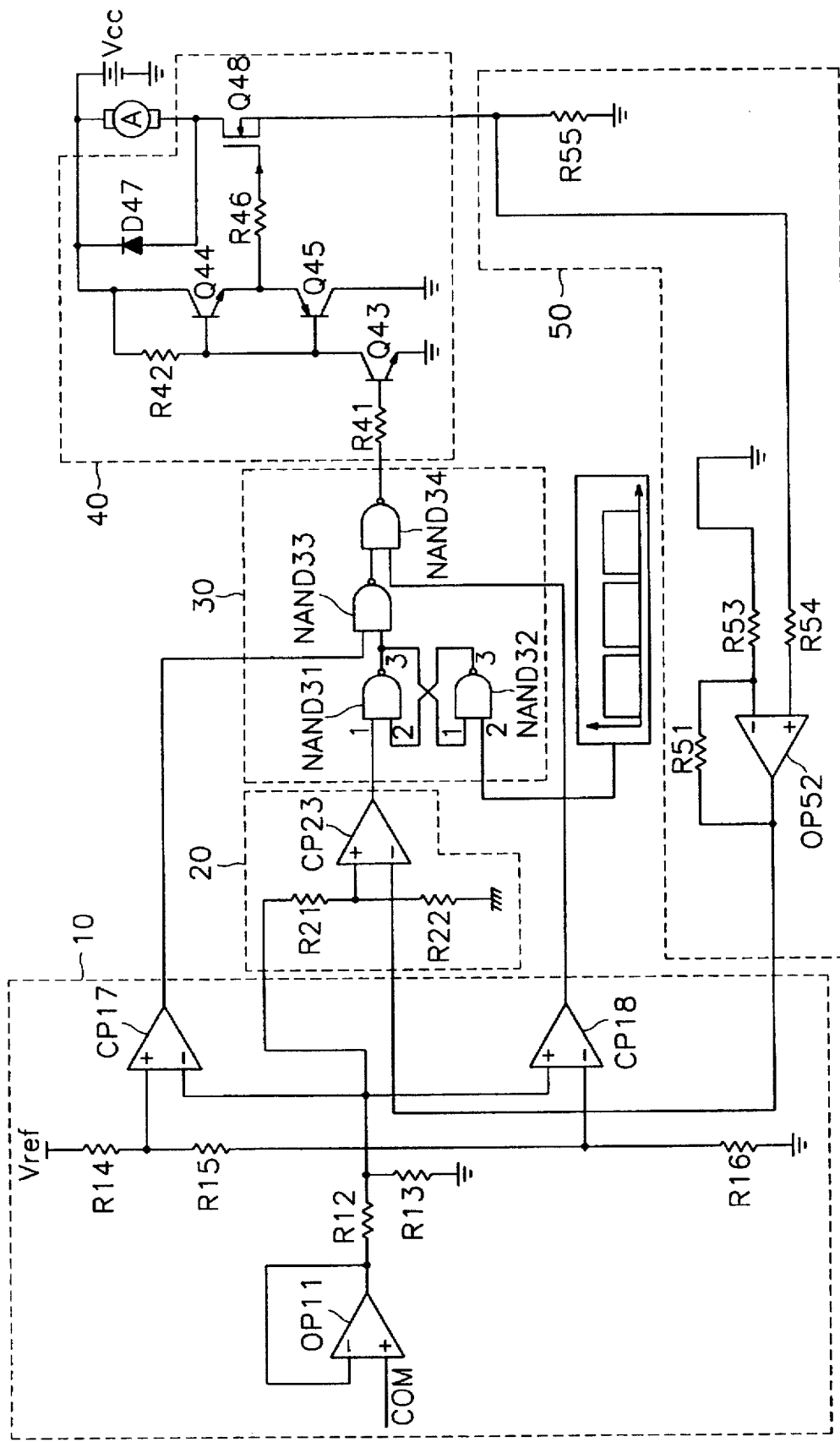
FIG. 1 is a circuit alarm of a conventional motor control circuit.
Figure 2A:
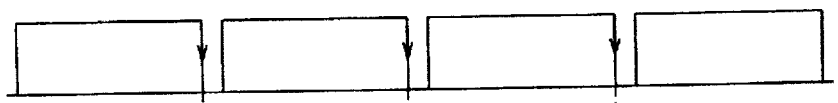
FIGS. 2A–2D are a diagram of waveforms generated at selected points of the circuit of FIG. 1.
Figure 2B:
Figure 2C:
Figure 2D:
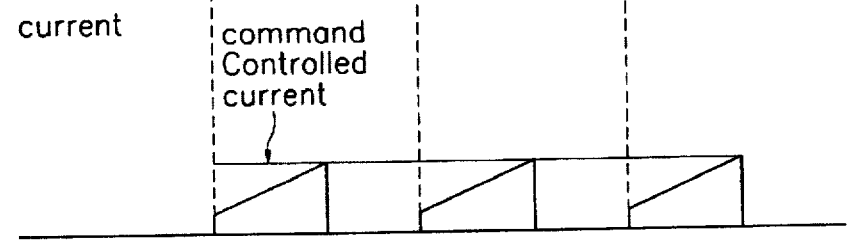
Figure 5:
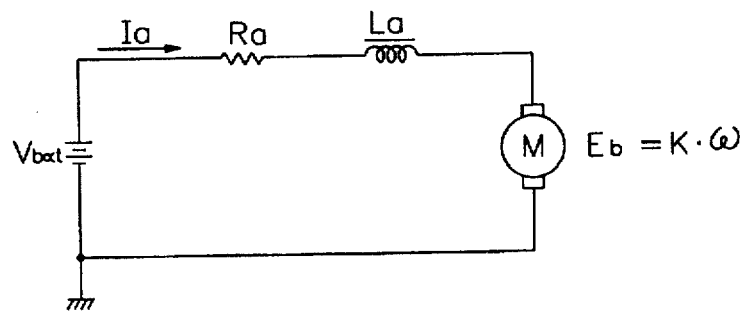
FIG. 5 is a diagram of a direct current motor.

The preferred embodiments of the present invention will be apparent from the following detailed description with reference to the accompanying drawings. The same reference numerals are used for components having the same functions.

The first embodiment of the present invention will be described in detail with reference to FIG. 3.

Figure 3:
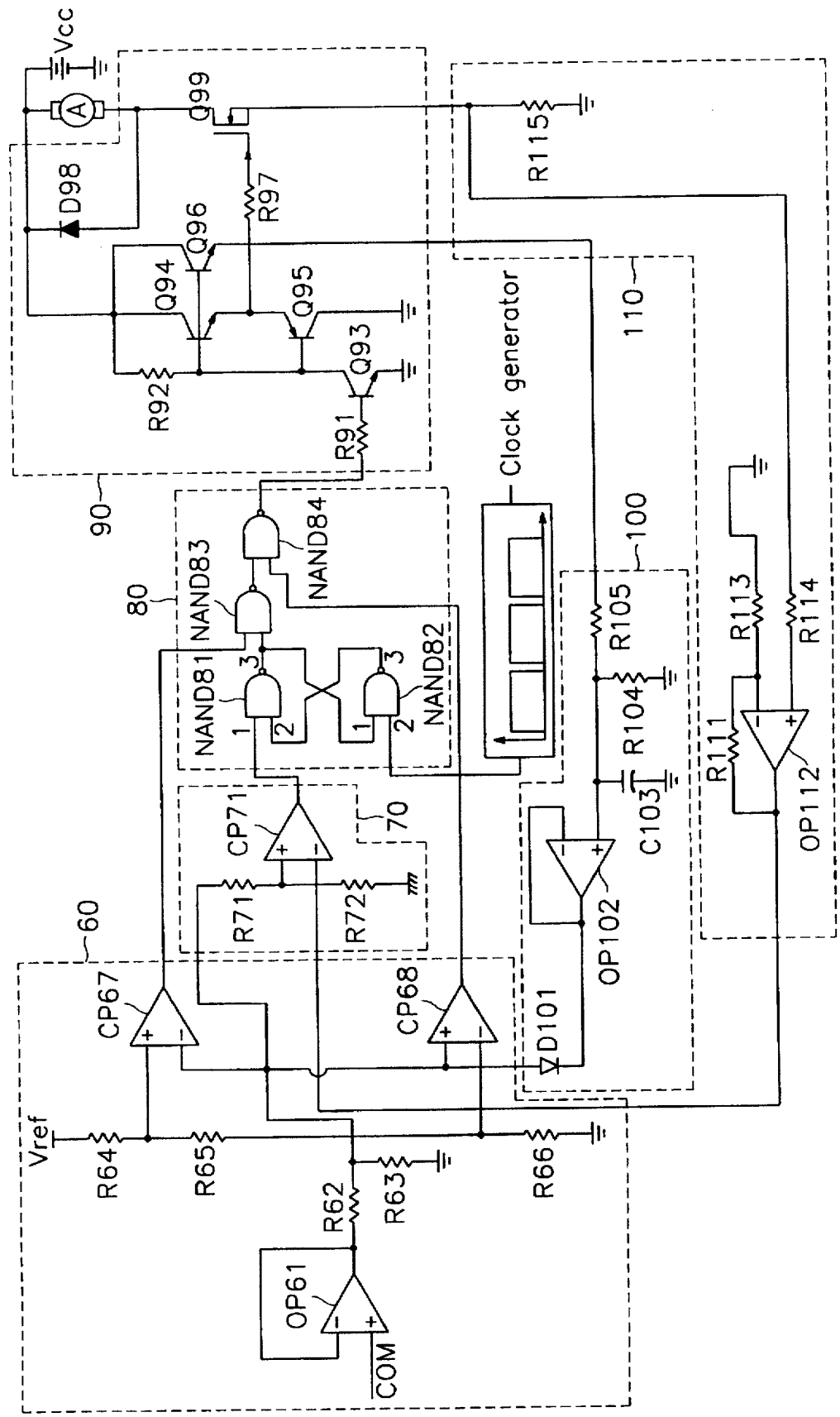
FIG. 3 is a diagram of a circuit constructed in accordance with a first preferred embodiment of the present invention.

As shown in FIG. 3, a circuit for preventing a motor from burning includes current command means (50, pulse width comparison means 70, output logic circuit means 80, output driving means 90, current detecting means 110 and current command control means 100. The current command means 60 receives a signal COM, and stabilizes the signal with a buffer OP61. The buffer generates a current command signal having maximum and minimum values which are limited by comparators CP67 and CP68.

The pulse width comparison means 70 receives and compares the current command with a current detecting signal generated by the current detecting means.

The output logic circuit means 80 includes nand gates NAND81, NAND82 which receive the output from the pulse width comparison means 70 and a clock signal. A low logic level is generated on output terminal 3 of the nand gate 81 if a high logic level is applied to the input terminal 1 of the nand gate NAND81 and a low logic level is applied the input terminal 2 of the nand gate NAND82. A high logic level is generated on the output terminal 3 of the nand gate 81 if a low logic level is applied to the input terminal 1 of the nand gate NAND81 and a high logic level is applied the input terminal 2 of the nand gate NAND82. The output logic circuit means 80 further includes NAND gates NAND 83, NAND 84 which limit the maximum and minimum values of the current command.

The output driving means 90 receives the control signal from the output logic means 80 and generates a driving control signal to drive the motor. Current detecting means 110 detects the current flowing to the motor and generates a current detecting signal which is suitably amplified for being compared at the pulse width comparison means 70.

The current command control means 100 receives the control signal from the output driving means 90, and converts it into nearly direct current with a condenser C103, and thereby generates a conditioned signal. A buffer OP102 is used to stabilize the control signal. When the conditioned signal is in a normal condition, the voltage thereof is same as the current command signal. But when excessive current flows in the motor, the voltage of the conditioned signal drops and therefore the voltage of the current command signal drops down, too. By this operation, the current command control means 100 controls the voltage of the current command signal.

The current command means 60 consists of:

an OP Amp OP61 which functions as a buffer wherein a signal COM is applied to a non-inverting input terminal thereof, and an inverting input terminal and output terminal thereof are connected;

a resistor R62 having one side connected to the output of the OP amplifier OP61;

a resistor 63 which is connected between the other side of the resistor R62 and ground;

a resistor 64 having one side connected to the reference voltage Vref;

a resistor 65 having one side connected to the other side of the resistor R64;

a resistor 66 which is connected between the other side of the resistor R65 and ground;

a comparator CP67 having the other side of resistor R64 connected to the non-inverting input terminal (+), the other side of the resistor R62 connected to the inverting input terminal (−), thereby limiting the maximum value of the current command; and a comparator CP68 having one side of resistor R66 connected to the inverting terminal (−) thereof, the other side of resistor R62 connected to the non-inverting terminal (+), thereby limiting the minimum value of the current command.

The pulse width comparison means 70 includes a resistor R71 having one side connected to the other side of resistor R62, a resistor R72 which is connected between the other side of the resistor R71 and ground, and a comparator 71 having a non-inverting terminal (+) connected to the other side of resistor R71.

The output logic means 80 includes a nand gate NAND81 having an input terminal connected to the output of the comparator CP71, and a nand gate NAND82 wherein the output terminal 3 of the nand gate NAND81 is connected with its input terminal 1. A clock pulse with a large duty cycle is connected to terminal 2 of the NAND gate 82, and its output terminal 3 is connected to the input terminal 2 of the nand gate NAND81.

The output terminal of the comparator CP67 is connected to the input terminal 1 of NAND gate 83, and the output terminal 3 of the nand gate NAND 81 is connected to input terminal 2 of the NAND gate 83. The output terminal of the comparator CP68 is connected to the input terminal 2 of NAND gate 84, and the output terminal 3 of the nand gate NAND 83 is connected to input terminal 1 of the NAND gate 84.

The output driving means 90 includes a resistor R91 having one side connected to the output terminal of the nand gate NAND84 and a transistor Q93 having the other side of the resistor R91 is connected to the base thereof. The emitter of transistor Q93 is grounded. A resistor R92 has one side connected to the collector of transistor Q93. A transistor (Q94 has one side of resistor R92 connected to the base thereof and the other side connected to the collector thereof. A transistor Q95-has the collector of transistor Q93 connected to base of the transistor Q95. The emitter of transistor Q94 is connected to the emitter of the transistor 95, the collector of which is grounded.

The output driving means 90 further includes a transistor Q96 having the base of transistor Q94 connected to the base thereof. The collector of the transistor Q94 is connected to the collector of transistor Q96 A transistor Q99 has one side of resistor R97 connected with the gate thereof. A diode D98 is connected to the power source Vcc via the cathode thereof with the drain of the transistor Q99 being connected to the anode.

The current detecting means 110 includes a resistor R115 which is connected between the source of the transistor Q99 and ground, a resistor R114 having one terminal is connected with the source of the transistor Q99, and a resistor R113 having one terminal is grounded. An OP Amp OP112 has the other terminal of the resistor R114 connected to its non-inverting input terminal, the other terminal of resistor R113 being connected to its inverting terminal. The output terminal of OP Amp OP112 is connected to the inverting input terminal (−) of comparator CP71, and a resistor R111 between the inverting input terminal and the output terminal of the OP amplifier OP112.

The current command control means 100 includes a resistor R105 having one terminal connected to the emitter of transistor Q96, a resistor R104 which is connected between the other terminal of the resistor R105 and ground, and a condenser C103 which is connected between one terminal of the resistor R104 and ground. An OP Amp OP102 has one terminal of the resistor R104 is connected to its non-inverting input terminal and its Inverting input terminal and output terminal connected together. A diode D101 has an anode connected to the input terminal (+) of the comparator CP68, as wall as to the input terminal (+) of comparator CP71 and to the input terminal (−) of comparator CP67.

Figure 6:
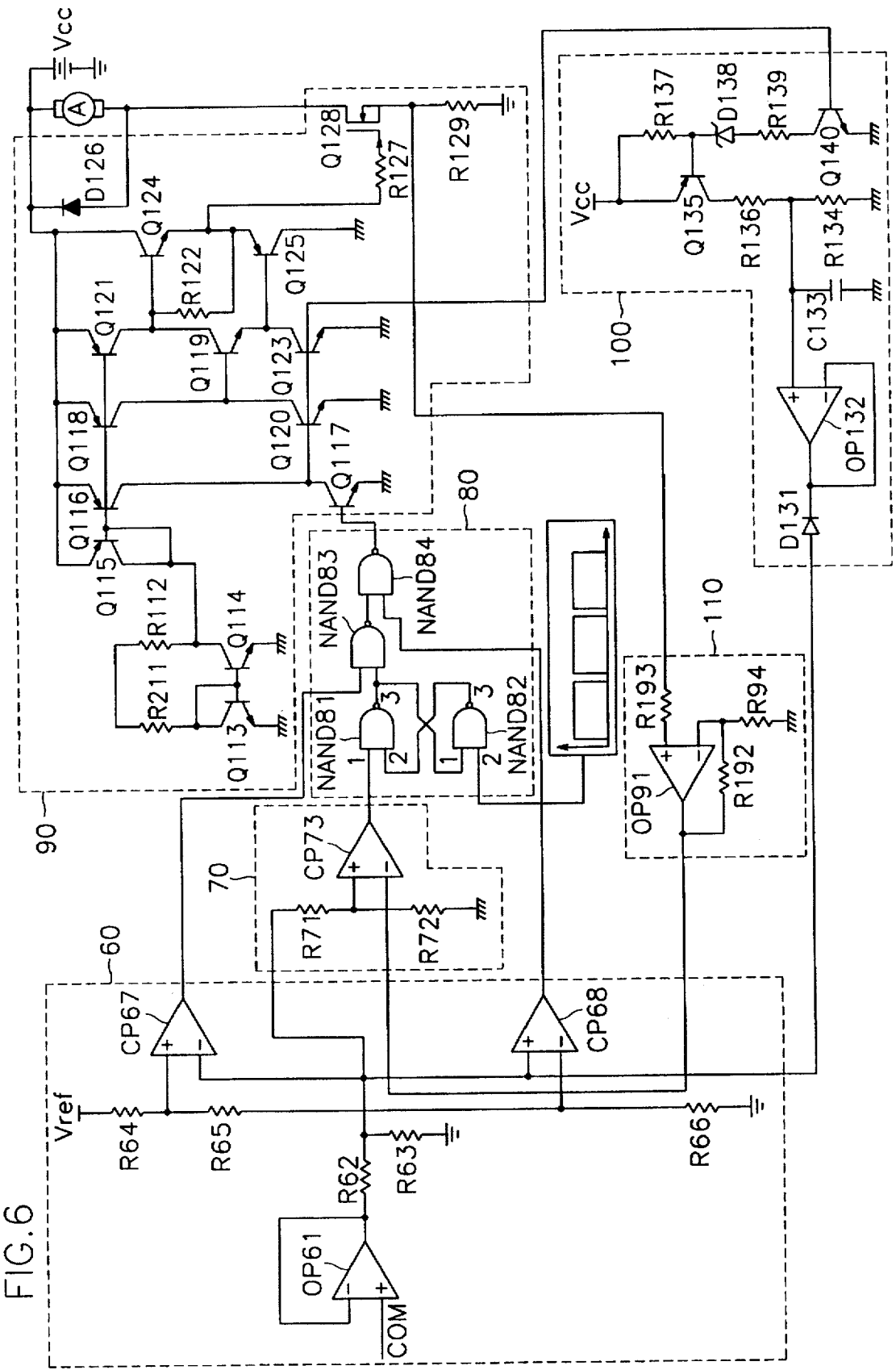
FIG. 6 is a diagram of a circuit constructed in accordance with a second preferred embodiment of the present invention.

According to the second embodiment of the present invention, as shown in FIG. 6, a circuit for preventing a motor from burning includes current command means 60, pulse width comparison means 70, output logic means 80, output driving means 90, current detecting means 110 and current command control means 100. The current command means 60, the pulse width comparison means 70 and the output logic means 80 have the same configuration and function as that of the first embodiment of the present invention.

The output driving means 90, however, includes a plurality of transistors and resistors, including transistor Q117 the base of which is connected to the output terminal of the nand gate NAND84 and the emitter of which emitter is grounded. A transistor Q120 has a base that is connected to the collector of transistor Q117 and an emitter that is grounded. A transistor Q123 has a base that is connected to the base of the transistor Q120 and a grounded emitter. The collector of transistor Q116 is connected with the collector of transistor Q117 with the emitted of transistor Q116 being connected to the power source Vcc. A transistor Q115 has a collector and base that ate connected to the base of the transistor Q116 and an emitter connected to the power source Vcc. A transistor Q114 has a collector connected to the collector of transistor Q115 and a resistor R112 and a grounded emitter. A transistor Q113 has a collector and base connected to the base of the transistor Q114 and a grounded emitter. A resistor R111 is disposed between the collector of the transistor Q113 and a voltage source Vref. A transistor Q118 has a base connected to the base of transistor Q116 and an emitter connected to the power source Yet. The base of transistor Q121 is connected to the base of transistor Q118 and the emitter thereof is connected to the power source Vcc. A transistor Q119 has a base connected to the collectors of transistor Q118, Q120 and an emitter is connected to the collector of the transistor 120, and a collector connected to the collector of the transistor Q121. A transistor Q125 has a base connected to the collectors of the transistor Q123 and a grounded emitter. A resistor R122 is disposed between the emitter of the transistor Q125 and the collector of the transistor Q119. A transistor Q124 has a base connected to the collectors of the transistor Q119, an emitter connected to the emitter of the translator 125, and a collector connected to the emitter of the transistor Q121. A resistor R127 has one end connected to the emitter of transistor Q124 and another end connected to the gate of the transistor Q128. A diode has an anode connected to the drain of the transistor Q128 and a cathode connected to the power source Vcc. A resistor R129 is disposed between the source of transistor Q128 and ground.

The current detecting means 110 includes a resistor R193 having one end connected to the source of the transistor Q129, and a resistor R94 having one end grounded. An OP Amp OP91 has the other end of resistor R193 connected to its non-inverting input terminal. The other end of resistor R94 is connected to the inverting input terminal of OP Amp OP91 and the output terminal thereof is connected to the input terminal (−) of comparator CP73, and a resistor R192 between the inverting input terminal and output terminal of the OP Amp OP91.

The current command control means 100 includes a transistor Q140 having a base connected to the base of the transistor Q123 and a grounded emitter. A resistor R139 has one end connected to the collector of transistor Q140. A diode D138 has an anode connected to the other end of the resistor R139. A resistor R137 is disposed between the cathode of the diode D138 and power source Vcc. A transistor Q135 has a base connected to the cathode of the diode D138 and an emitter connected to the power source Vcc. A resistor R136 has one end connected to the collector of transistor Q135. A resistor R134 has one end connected to the other end of the resistor R136. A condenser C133 is disposed between the other end of the resistor R136 and ground. An OP Amp OP132 has the other terminal of the resistor R136 connected to its non-inverting input terminal, and its inverting input terminal and its output terminal connected with each other. A diode has an anode connected to the non-inverting input terminal of the comparator CP68 and a cathode connected to the output terminal of the operational amplifier OP132.

Operation in accordance with the first preferred embodiment of the present invention depicted in FIG. 3 is described below.

When the motor works normally, the voltage of the conditioned signal of the current command control means 100 is the same or higher than that of the current command COM. When the current command signal is applied to the input terminal of OP Amp OP61, the current command signal COM is stabilized by the buffering action of OP Amp OP61. The voltage of the current command signal is divided by the resistors R62, R63 and is divided again at the junction of resistors R71, R72 of the pulse width comparison means 70. The divided voltage is applied to the input terminal (+) of the comparator CP71. A current detecting signal generated by the current detecting means 110 is applied to the other input terminal (−) of the comparator CP71.

When power Vcc is supplied to the motor, the voltage of the motor increases due to its inductive reactance. The voltage of the motor can be represented by a change of current with respect to a change in times. The voltage of the motor is detected by resistor R115 and is applied to the non-inverting terminal of non-inverting amplifier OP112 through resistor R114. The voltage on resistor R115 is amplified and applied to the input terminal (−) of the comparator CP71 of the pulse width comparison means 70 for comparison with the current command COM.

The comparator CP71 generates a high logic level voltage output if the current command signal is higher than the current detecting signal and generates a low logic level voltages output if the current command signal is lower than the current detecting signal. The current command signal is a direct current voltage and the current detecting signal is a voltage that gradually increases to a fixed level. That is, the voltage of the leading edge of the current detecting signal is low and that of the trailing edge is high as shown in the waveform a' in the FIG. 4D. Therefore, the current detecting signal has the same value as the current command COM toward the trailing edge of the current detecting signal. The point where these two voltages are the samee is generally referred to as a comparison point. At that point, the output of the comparator CP71 changes to a low logic level.

The output signal of the pulse width comparison means 70 is applied to the input terminal 1 of the nand gate NAND81 of the output logic means 80 and the clock signal having a large duty cycle is applied to the input terminal 2 of the nand gate NAND82. The combination of nand gates NAND81 and NAND82 is referred to herein as a logic circuit, which functions as a conventional RS flip-flop circuit. If a high logic level is applied to the input terminal 1 of the nand gate NAND81 and a low logic level Is applied to the input terminal 2 of the nand gate NAND82, a low logic level is generated at output terminal 3 of nand gate 81. If a low logic level is applied to input terminal 1 of nand gate NAND81 and a high level is applied to input terminal 2 of nand gate NAND82, a high logic level is generated at output terminal 3 of the nand gate 81.

Figure 4A:
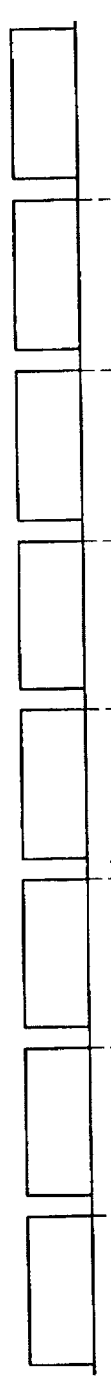
FIGS. 4A–4D are is a diagram of waveforms generated at selected points of the circuit of FIG. 3.
Figure 4B:
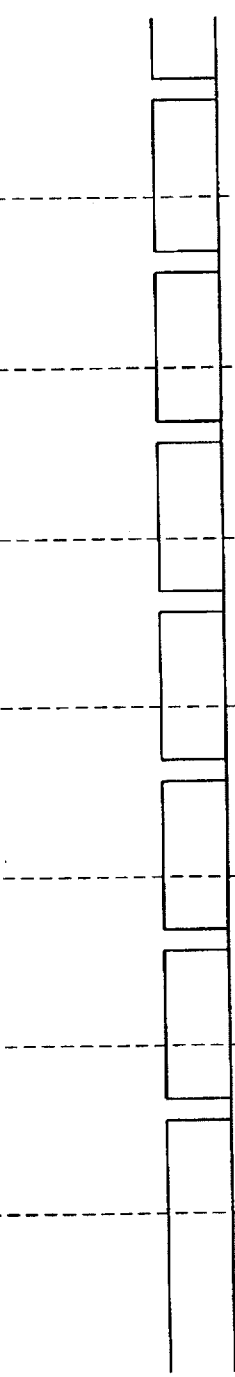
Figure 4C:
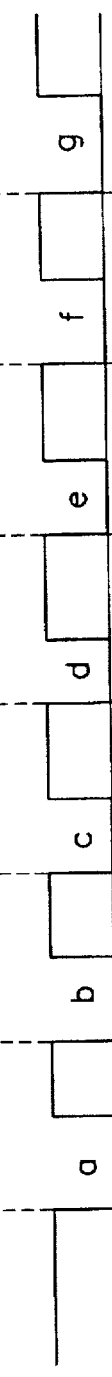

Accordingly, a control signal waveform a, as shown in FIG. 4C, appears at the output terminal of nand gate NAND81. The control signal is applied to input terminal 2 of the nand gate NAND83 and the signal generated at the output of comparator CP67 is applied to input terminal 1 of nand gate NAND83.

When a reference voltage Vref is applied to the resistors R64, R65, R66, the voltage at the juncture of resistors R64, R65 is applied to the input terminal (+) of the comparator CP67, the current command voltage being applied to input terminal (−) of the comparator CP67. When the current command COM is higher than the voltage of the resistor R64, R65, the comparator CP67 generates a low logic level output thereby causing nand gate 83 to generate a high logic level output. The output of the comparator 68 is applied to input terminal 2 of the nand gate NAND84. The current command voltage is applied to the input terminal (+) of the comparator CP68 with the voltage at the juncture of resistors R65, R66 being applied to the input terminal (−) of comparator CP68.

The nand gates generate low logic level outputs when both of the first and the second input terminals receive high logic levels, and generate high logic level outputs in other cases.

When the voltage of the current command signal is higher than the fixed voltage between resistors R64, R6, the comparator CP68 generates a high logic level output. This causes nand gate NAND84 to pass the inversion of the signal appearing on the output of nand gate NAND83. When the voltage of the current command signal is lower than the fixed voltage appearing between resistors R64, R65, the comparator CP67 generates a high logic level output. Therefore, an inverted waveform of the output of the nand gate NAND81 is generated on output terminal 3 of nand gate NAND83. When comparator CP67 generates a high logic level output, comparator CP68 generates a low logic level and, thereby, a high logic level is generated by nand gate NAND84. Therefore when the voltage of the current command is higher than a first predetermined value, the rotation speed of the motor is not affected by the circuit. In addition, when the voltage of the current command is lower than a second lower predetermined value, the motor does not rotate with enough speed for operation. In other words, the current command signal being higher or lower than the predetermined values does not in and of itself necesssarily control the current in the motor. This is the case with the prior art circuit of FIG. 1. The comparator C67 therefore makes the motor rotate with full speed when the current command COM is higher than the first predetermined value. The comparator C68 makes the motor stop when the current command is lower than the second predetermined value.

In the first embodiment of the present invention, the control signal of the output logic circuit means 80 is applied to the base of a transistor Q93 of the output driving means 90 through the resistor R91. When the control signal is at a high logic level, the transistor Q93 is turned on and the voltage from the power source Vcc flows to the ground through the resistor R92 and the transistor Q93. When the voltage from the power source Vcc flows to the ground through the resistor R92 and the transistor Q93, the base of the transistor Q94 receives a low logic level and thus turns off. The voltage of the resistor R92 is same as the bias voltage between the base and the emitter of the transistor Q95. The voltage of the resistor R97 and the voltage of the transistor Q99 thus becomes a low logic level and the motor does not rotate. When the control signal is at a low logic level, the transistor Q93 turns off, and the voltage between the collector and the emitter of the transistor Q93 is same as the bias voltage between the base and the emitter of the transistor Q94. Therefore the transistor Q94 turns on and the transistor Q95 turns off. The voltage from the power some Vcc is applied to the gate of the transistor Q99 through the transistor Q94 and the resistor R97 to turn on the transistor Q98, which makes the motor work. In this case, the voltage of the output signal of the current command control means 100 is same or higher than the current command signal of the current command means 60.

In the second embodiment of the present invention, the control signal from the output logic means 80 is applied to the base of transistor Q117 of the output driving means 90. When the control signal is at a high logic level, the transistor Q117 turns on. The resistors R211, R112 and the transistors Q113, Q114 are work as a current source and are provided for the stable operation of the output driving moans 110, Also, the transistors (Q115, Q116, Q118, Q121) work as an independent current source. When the transistor Q117 turns on, the voltage from the power source Vcc flows to the ground through the transistors Q116, Q117. When the voltage from the power source Vcc flows to the ground, the base of the transistor Q120 receives a low logic level and turns off. The voltage between the collector and emitter of transistor Q120 works to bias transistor Q119 thereby turning it on. Voltage Vcc thus flows to the ground through the transistors Q124 and Q125. The transistor Q128 is thus turned off and the motor is stopped.

When the control signal is at a low logic level, the transistor Q117 turns off, and the voltage between the collector and the emitter of the transistor Q117 is same as the bias voltage of the transistor Q120. Therefore the transistor Q120 turns on and the voltage from the power source Vcc flows to the ground through the transistors Q118, Q120. Therefore the voltage of the base of the transistor Q119 has low logic level voltage, and the transistor Q119 turns off. Then the voltage between the collector and emitter of the transistor Q119 works as a bias voltage between base and emitter of the transistor Q124 thereby turning it on. So the transistor Q124, Q128 am turned on and the voltage Vcc flows to the gate of the transistor Q128 through the transistor Q124 and a resistor R127. Turning on me transistor Q128 starts motor operation. In this embodiment, the diode D126 is a free wheeling diode which discharges the current arising from the inductance of the motor when a user turns off the power to the motor.

When an overcurrent condition arises in the motor due to external influences, e.g., as a result of an overload, the inductive reactance of the motor decreases and thereby increases the gradient of the current detecting signal. The crossing, or comparison, point of the current command COM and the current detecting signal having a steeper gradient therefore moves toward the rising edge of the current detecting signal. The pulse width thus decreases and the output signal of the comparator CP71 has a waveform such as shown in the FIG. 4B.

The output signals of the comparator CP71 and nand gate NAND81 have a smaller duty cycle waveform, as shown in FIG. 4C, which is applied to the output driving means through the nand gates NAND83 & NAND84. As described above, the nand gates NAND83 & NAND84 limit the maximum and minimum values of the current command. The output driving means 90 drives the motor and supplies the control signal having smaller duty rate to the current command control means 100.

Figure 4D:
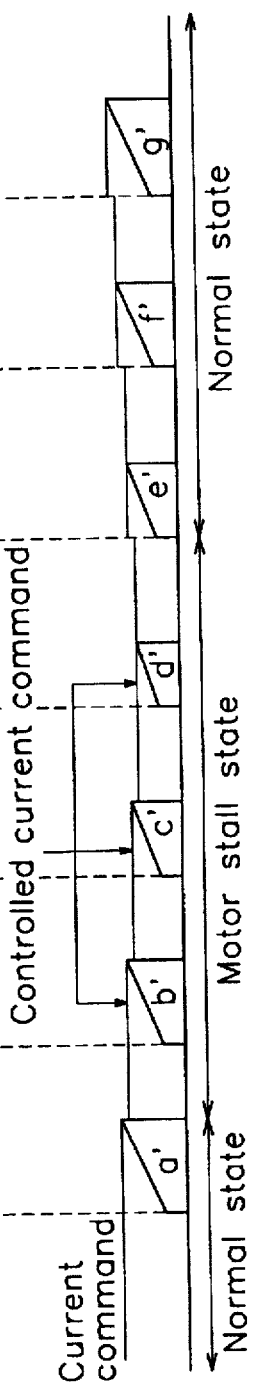

In the first embodiment of the present invention, the control signal is conditioned nearly direct current by the resistors R104 and R105 and the condenser C103 of the current command control means 100. The current command control means 100 outputs the conditioned signal to be compared with the current command signal. The voltage of conditioned signal drops because the duty cycle of the control signal decreases, with the potential difference between the current command and the conditioned signal being generated proportional to duty the decrease in the duty cycle. Current generated by the potential difference flows through the diode D101 and reduces the voltage of the current command signal as shown in FIG. 4D. The reduced voltage of the current command signal is compared with the current detecting signal at the pulse width comparison means 70, and the comparison point moves toward the leading edge. The duty rate of the control signal of the output logic means 80 is thus reduced to limit the current flowing to motor.

In the second embodiment of the present invention, the control signal is applied to the transistor Q140, with zener diode D138 having a constant voltage. The current of the power source Vcc flows to the ground through resistors R134, R136. The voltage of the resistor R134 is applied to buffer OP132. The resistance of the resistor R134 is selected so that the voltage of the output of the buffer OP132 is same with that of the current command signal.

When excessive current flows in the motor, the voltage of conditioned signal and the voltage of the resistor R134 drops because the duty cycle of the control signal decreases. Therefore, the voltage on resistor R134 is decreases. Accordingly, the potential difference between the current command signal and the conditioned signal on the output of buffer OP132 is generated proportional to the decrease in duty cycle. The current generated by the potential difference flows through the diode D131 and reduces the voltage of the current command signal.

If excessive current flows continuously in the motor as a result of the motor being mechanically restrained from rotation, the current command control means 100 reduces the voltage of the current command signal and continuously provides a control signal having a decreased duty cycle at the pulse width comparison means 70 and the output logic circuit means 80 and thereby limits the current flowing to the motor.

The signal waveforms a, b, c, and d, of FIG. 4C and the signal waveforms a', b', c', and d' of FIG. 4D show that the duty cycle of the control signal of the output logic means 80 is decreased and the voltage of the current command signal is decreased automatically by the current command control means 100 when excessive current flows in the motor.

When motor stops, the current flowing to the motor is limited to a minimum to prevent excessive cent and thereby both reduce power consumption and prevent damage to the motor. Afterward, when the motor is in a normal unconstrained state, the inductive reactance element of the motor is again increased thus increasing the duty cycle, the output voltage of the current command control means 100 and the current command signal.

The signal waveforms d, e, f, and g of FIG. 4C and the signal waveforms d', e', f', and g' of FIG. 4D show that the signals which result from resumption of motor operation after constraint of the motor is eliminated.

In accordance with preferred embodiments of the present invention, the current command control means 100 receives the control signal from the output driving means 90 and restricts the current command signal according to the duty cycle of the control signal thereby decreasing current flowing at motor to prevent motor from burning.

The functions of the present invention can be utilized in a protection circuit for a direct current motor used, e.g., to drive a fan in a heater or air conditioner or to drive a radiator fan of an automobile.

What is claimed is:

1. A method for preventing excessive current flow in a d.c. motor comprising:

generating a current command signal;

generating a motor-current signal proportional to current flowing in the motor;

generating a current control signal dependent upon the relative magnitudes of the current command signal and the motor-current signal; and adjusting the magnitude of the current command signal proportional to the current control signal when the current control signal is below a preselected value.

2. The method of claim 1 wherein said preselected value is proportional to the current command signal.

3. The method of claim 2 wherein adjusting the magnitude of the current command signal proportional to the current control signal when the current control signal is below a preselected value comprises:

applying a signal proportional to the current command signal to the anode of a diode; and applying a signal proportional to the current control signal to the cathode of the diode.

4. The method of claim 1 wherein the step of adjusting the magnitude of the current command signal proportional to the current control signal when the current control signal is below a preselected value comprises reducing the current command signal.

5. A circuit for preventing excessive current flow in a d.c. motor of the type driven responsive to a control signal developed by comparing the current flowing in the motor to a current command signal, said circuit comprising:

a comparator for comparing the current flowing in the motor with the current command signal and having a terminal to which the current command signal is applied;

a logic circuit operatively connected to the comparator, said logic circuit reducing the duty cycle of the control signal responsive to increased current flowing in the motor; and a current command control circuit having an input terminal to which a signal proportional to said control signal is applied and an output terminal operatively connected to said comparator terminal, said current command control circuit adjusting the potential on said comparator terminal proportional to decreases in the control signal.

6. The circuit of claim 5 wherein said control signal comprises a plurality of sequential pulses and wherein said current command control circuit includes a capacitor to which said pulses are applied for generating a current command control signal.

7. The circuit of claim 6 wherein said current command control circuit further includes a rectifier having a cathode to which said current command control signal is applied and an anode operatively connected to said comparator terminal.

8. A motor control circuit comprising:

a current command circuit for generating a current command signal proportional to a selected motor speed;

a comparator for generating a comparator output signal proportional to the difference between the current command signal and a signal proportional to current flow in the motor;

a logic circuit operatively connected to an output terminal of said comparator, said logic circuit generating a control signal having a duty cycle which varies proportional to the comparator output signal;

a drive circuit having an input terminal to which said control signal is applied and an output terminal connected to said motor, said drive circuit generating a motor drive signal proportional to said control signal for driving said motor; and a current command control circuit having an input terminal to which said control signal is applied and an output terminal to which said current command signal is applied, said current command control circuit generating a signal proportional to said control signal and reducing said current command signal when said proportional signal is less than said current command signal.

9. The circuit of claim 8 wherein said control signal comprises a plurality of sequential pulses and wherein said current command control circuit includes a capacitor to which said pulses are applied for generating said proportional signal.

10. The circuit of claim 9 wherein said current command control circuit further includes a rectifier having a cathode to which said proportional signal is applied and an anode to which said current command signal is applied.

* * * * *

UNITED STATES PATENT AND TRADEMARK OFFICE
CERTIFICATE OF CORRECTION

PATENT NO.   : 5,721,474
DATED        : February 24, 1998
INVENTOR(S)  : Lee et al.

It is certified that error appears in the above-identified patent and that said Letters Patent is hereby corrected as shown below:

Column 2,
Lines 3 and 16, "CF23" should read -- CP23 --.

Column 23,
Line 23, "Found" should read -- ground --.
Line 59, "alarm" should read -- diagram --.

Column 4,
Line 17, "50" should read -- 60 --.

Column 5,
Line 48, "(194" should read -- Q94 --.

Column 6
Line 16, "wall" should read -- well --.
Line 37, "emitted" should read -- emitter --.
Line 39, "ate" should read -- are --.
Line 48, "Yet" should read -- Vcc --.
Line 60, "translater" should read -- transistor --.

Column 9,
Line 23, "some" should read -- source --.
Line 23, "moans" should read -- means --.
Line 59, "am" should read -- are --.

Column 11,
Line 2, "cent" should read -- current --.

Signed and Sealed this

Third Day of September, 2002

Attest:

Attesting Officer

JAMES E. ROGAN
Director of the United States Patent and Trademark Office